United States Patent Office 2,832,717
Patented Apr. 29, 1958

2,832,717
PARTIALLY HYDROLYZED BROMINATED PROTEIN

Edgar A. Ferguson, Jr., Brooklyn, N. Y.

No Drawing. Application July 14, 1952
Serial No. 298,839

5 Claims. (Cl. 167—55)

The present invention relates to a therapeutic agent useful in the treatment of ulcers and more particularly to a brominated, partially hydrolyzed protein such as casein which is useful in the treatment of ulcers.

It is an object of the present invention to provide a process for producing a new therapeutic agent useful in the treatment of ulcers.

It is another object of the present invention to provide a process for partially hydrolyzing and brominating a protein such as casein or lactalbumin so as to produce a therapeutic agent which will be useful in the treatment of ulcers.

It is still another object of the present invention to provide a new therapeutic agent which co-acts synergistically with sodium carboxymethylcellulose and can be used in combination therewith as a new therapeutic agent in the treatment of ulcers.

With the above objects in view the process of the present invention mainly consists in the steps of hydrolyzing a protein to an extent sufficient to convert between 25 and 50% of the protein nitrogen to amino nitrogen, thereby forming a mixture of protein and amino acids; and treating the thus formed mixture with bromine so as to brominate the protein and amino acids of said mixture, thereby obtaining a brominated partially hydrolyzed protein product, useful as a therapeutic agent.

According to a preferred embodiment of the present invention the protein which is used is either casein or lactalbumin, preferably casein, the best results having been obtained by the use of these two proteins and particularly good results having been obtained by the use of casein.

Since the product of the present invention is to be taken internally it is preferred that the final brominated, partially hydrolyzed protein product is neutralized to a pH of about 7 before it is used as an internal agent. The manner of neutralization may be by any common means.

If the hydrolyzation of the protein is carried out by means of an acid such as hydrochloric acid, sulfuric acid, acetic acid, etc., the final product is neutralized by a mild alkali such as sodium carbonate, dilute sodium hydroxide, etc. If the hydrolyzation is carried out by means of a base such as sodium hydroxide, calcium hydroxide, sodium carbonate, sodium bicarbonate, etc., the final neutralization is of course carried out with an acid.

According to another embodiment of the present invention it is possible to carry out the hydrolyzation of the protein by means of enzymes such as pancreatin, pepsin, etc. The enzymatic hydrolyzation is carried out preferably under the optimum conditions for each particular enzyme which is utilized, i. e., 38 to 40° C. Since the optimum conditions may be acidic or basic depending on the particular enzyme it may still be necessary to neutralize the final product before it is used internally.

It is to be understood that the term "hydrolyzation," as used in the specification and claims of the present invention, is meant to refer to the partial hydrolyzation of the protein resulting in a transformation of between 25 and 50% of the protein nitrogen to amino nitrogen. Complete hydrolyzation is neither contemplated nor desired according to the present invention.

It is preferred according to the present invention that about 50% of the protein nitrogen is tranformed by hydrolyzation into amino nitrogen and the resulting mixture of protein and amino acid is brominated according to the present invention to between 3 and 25% by weight of the original protein. A protein can generally be brominated to as high as 30% of the total weight of the original protein. The control of bromination according to the present invention is in order to achieve the best results of the bromine in the final product while keeping the amount of bromine within the U. S. P. accepted dosage. It is preferred according to the present invention that the amount of bromine be between 5 and 10% by weight and most preferably about 8% by weight of the final product.

The therapeutic agent according to the present invention essentially consists of a partially hydrolyzed protein having between 25–50% of the protein nitrogen of said protein converted by hydrolyzation to amino nitrogen, said partially hydrolyzed protein brominated to between 3–30% by weight of the weight of said protein. As stated above the preferred bromine content according to the present invention is between 5–10% by weight of the weight of said protein and the most preferred bromine content is 8% by weight.

The extent of hydrolyzation to which the protein material is subjected is determined by testing the amount of amino nitrogen produced. The hydrolyzation is stopped after between 25–50% of the original protein nitrogen has been converted to amino nitrogen. At first it will, of course, be necesary to test samples of the hydrolyzed protein in order to determine how much of the protein nitrogen has been converted to amino nitrogen, but after a few trial runs it will be possible to determine this simply on a time basis, the time being determined from experience. The hydrolyzation of the protein is stopped either by neutralizing the reaction mass in the case where the hydrolyzation is being carried out either by an acid or a basic hydrolyzation agent; or by changing the temperature or pH conditions in the event that enzymatic hydrolyzation is utilized. In either event it is preferable to stop the hydrolyzation after about 50% of the original protein has been converted to amino nitrogen.

50% amino nitrogen is the most preferred value in order to obtain a balance between the amount of protein and the amount of amino acids in the final composition. The final composition will consist essentially of protein bromide and amino acids bromide with a small quantity of inorganic bromide. The most efficient results in the treatment of ulcers have been found where the balance between the protein and amino acid is about 50:50.

There is a lessening of efficiency in the treatment of ulcers where there is too little protein bromide present and there is also a lessening of efficiency if there is too great an amount of bromide present.

The composition of the present invention is taken into the system orally and coats the surface of the ulcer, the composition having a glue-like tenacity on the surface, and thereby prevents attack of the ulcer by the gastric acids. When the surface of an ulcer is exposed the ulcer has a tendency to digest itself, an ulcer being a break in the protective mucosa of the intestinal lining. The coating of the ulcer by the composition of the present invention prevents the self digestion of the ulcer and thereby aids in actually curing the ulcer.

If the amount of protein bromide in the final composition is too low the composition does not have a sufficient glue-like tenacity to remain coated on the walls of the intestine and particularly over the ulcer. If none of the protein is converted to amino acids then there is too great an amount of protein taken into the system, which protein must be digested by the body, the protein acting as a food in the body. This places too great a burden of digestion on the stomach encouraging production of gastric acids in the stomach and therefore actually harming the ulcer rather than aiding the ulcer as is done by the product of the present invention.

In order to gain beneficial results in the ulcer treatment it is absolutely necessary according to the present invention to have this balance between amino acids and protein, the balance resulting in glue-like tenacity of the product to coat the ulcer and yet a sufficient amount of protein being converted to amino acids so that there is not as great an amount of digestion taking place in the intestine and therefore there is no excess secretion of gastric acids caused.

X-ray testing on many ulcerated patients has proved that the product of the present invention actually coats the ulcerated surface. It is a well known medical fact that if an ulcerated surface can be kept coated for a sufficient length of time the ulcer will eventually heal. It can therefore be seen that the present invention has a great therapeutic value.

The product of the present invention is generally given by tablet, powder, wafer form, or in the powder mixed with milk. The average daily dose is 12 grams given three times daily. It is to be understood that the above is merely given to clearly point out the present invention and is in no way meant to limit the scope thereof.

In tablet form the brominated partially hydrolyzed casein, casein being preferred, is mixed with any common pharmaceutical carrier. It is to be understood that all pharmaceutical carriers are useful in the manufacture of tablets, wafer, or other preparation according to the present invention. However, to more clearly disclose the present invention the following are given as types of pharmaceutical carriers which are used:

(1) A granulation mixture of beta-lactose
(2) A granulation mixture of sucrose
(3) Mannitol
(4) A granulation mixture of honey
(5) A filler such as chalk It has been particularly advantageous according to the present invention to utilize sodium carboxymethylcellulose in addition to the pharmaceutical carrier and in combination with the brominated partially hydrolyzed protein in the preparation of a therapeutic agent which is particularly useful in the treatment of ulcers.

It is known that sodium carboxymethylcellulose alone is somewhat effective in the treatment of ulcers. It is not too effective because the sodium carboxymethylcellulose does not neutralize the gastric acids and in acid media it loses its ability to coat the ulcer. Although brominated, partially hydrolyzed casein can be used alone according to the present invention, the substance is quite expensive and it has therefore been found extremely useful to mix the substance with sodium carboxymethylcellulose. It has also been found that the use of sodium carboxymethylcellulose is beneficial and co-acts with the brominated partially hydrolyzed casein. Besides reducing the amount of the product of the present invention which is necessary, thereby reducing the expense of ulcer treatment according to the present invention, the use of sodium carboxymethylcellulose is valuable in that it reduces the amount of protein material which will finally have to be digested by the body and therefore reduces the amount of gastric acids which are produced in the intestine, thereby aiding in treatment of the ulcer.

For reasons of economy it is preferred to utilize as much sodium carboxymethylcellulose as possible thereby reducing the amount of brominated partially hydrolyzed protein which is necessary. It has been found according to the present invention that a mixture of one part of sodium carboxymethylcellulose for each part brominated partially hydrolyzed protein has the best effect as a balance between economy and ulcer treatment. If the amount of brominated partially hydrolyzed protein is too greatly reduced all of the good effect produced by this product is lost. Of course if the amount is too great the expense becomes higher.

Although it is not meant to limit the scope of the present invention by a discussion as to the theory of how the product of the present invention operates in the treatment of ulcers, the following theory is given. It is assumed that the bromine in the body has a soporific effect and is actually anesthetic both locally and systemically so that besides the glue-like coating treatment produced by the protein, the anesthetic effect of the bromine reduces the pain of the ulcer which is also considerably advantageous in the treatment of ulcers. When brominating the partially hydrolyzed protein the bromine does not replace any of the elements in the protein but is actually added to the protein as a loose adjunctive thereto which makes it easy for the bromine to be freed in the body and for the bromine to have an anesthetic effect in the body.

The following example is given so as to more clearly disclose the present invention, the scope of said invention not however being limited thereto.

*Example I.*—One kilogram of casein is placed in a large crock. To this is added 3000 cc. of clean water. 50 cc. of 15/N HCl is then added. This mixture is heated at about 60° C. for 2 hours with occasional stirring. 50% of the protein nitrogen is found to have been converted to amino nitrogen. The mixture is then cooled and neutralized with 5 grams sodium hydroxide in 80 cc.

80 grams of elementary bromine is added in the presence of 10 cc. of glacial acetic acid. This is stirred occasionally at room temperature for about 1 hour. Another incubation is carried on for 2 hours with the temperature of 60° C. At the end of this time the whole mixture is cooled and placed in a large pan to dry.

An alternate procedure consists in decanting the supernating fluid and then allowing it to dry. The bromine content of the resulting composition is determined and found to be about 8% of the original amount of casein, all of the bromine having been taken up by the partially hydrolyzed casein.

*Example II.*—This example is carried out exactly as Example I, utilizing 1 hour of hydrolyzation instead of 2 hours. The resulting product has only 25% of the protein nitrogen converted to amino nitrogen.

*Example III.*—A unit dose in the treatment of ulcers (3 units per day) comprising 12 grams of partially hydrolyzed casein having 50% of the protein nitrogen converted to amino nitrogen and being brominated to 8% by weight of the weight of the protein.

*Example IV.*—A unit dose in the treatment of ulcers (3 units per day) comprising 10 grams of partially hydrolyzed lactalbumin having 30% of the protein nitrogen converted to amino nitrogen and being brominated to 10% by weight of the weight of the protein.

*Example V.*—A unit dose in the treatment of ulcers (3 units per day) comprising 6 grams of partially hydrolyzed casein having 25% of the protein nitrogen converted to amino nitrogen and being brominated to 5% by weight of the weight of the protein and containing 6 grams sodium carboxymethylcellulose.

*Example VI.*—A unit dose in the treatment of ulcers (3 units per day) comprising 3 grams sodium carboxymethylcellulose and 9 grams partially hydrolyzed lactalbumin having 50% of the protein nitrogen converted to amino nitrogen and being brominated to 15% by weight of the weight of the protein.

It has been found according to the present invention that when using a chemical combination of the above mentioned ingredients in a form of partially hydrolyzed brominated lactalbumin or partially hydrolyzed brominated casein the effectiveness in the treatment of ulcers has been excellent.

What is claimed as new and is to be desired by Letters Patent is:

1. A process of producing a therapeutic agent useful in the treatment of ulcers, comprising the steps of hydrolyzing at least one protein to an extent sufficient to convert between 25 and 50% of the protein nitrogen to amino nitrogen, thereby forming a mixture essentially consisting of protein and amino acids; and treating the thus formed mixture with bromine so as to brominate the protein and the amino acids of said mixture, thereby obtaining a brominated partially hydrolyzed protein product useful as a therapeutic agent.

2. A process of producing a therapeutic agent useful in the treatment of ulcers, comprising the steps of hydrolyzing at least one protein to an extent sufficient to convert between 25 and 50% of the protein nitrogen to amino nitrogen, thereby forming a mixture essentially consisting of protein and amino acids; treating the thus formed mixture with bromine so as to brominate the protein and amino acids of said mixture, thereby obtaining a brominated partially hydrolyzed protein product useful as a therapeutic agent; and neutralizing the thus formed brominated partially hydrolyzed protein product to a pH of about 7.

3. A therapeutic agent useful in the treatment of ulcers essentially consisting of a brominated partially hydrolyzed protein having between 25–50% of the protein nitrogen of said protein converted by hydrolyzation prior to bromination to amino nitrogen.

4. A therapeutic agent useful in the treatment of ulcers essentially consisting of a brominated partially hydrolyzed protein having between 25–50% of the protein nitrogen of said protein converted by hydrolyzation prior to bromination to amino nitrogen and containing between 3–25% bromine by weight of the weight of said protein.

5. A therapeutic agent useful in the treatment of ulcers essentially consisting of a brominated partially hydrolyzed protein having between 25–50% of the protein nitrogen of said protein converted by hydrolyzation prior to bromination to amino nitrogen; and sodium carboxymethylcellulose in an amount of approximately 1 part brominated partially hydrolyzed protein per each part of sodium carboxymethylcellulose.

References Cited in the file of this patent

UNITED STATES PATENTS 2,477,080    Necheles _____ July 26, 1949

FOREIGN PATENTS 7,097    Great Britain _____ of 1898

OTHER REFERENCES

Annals of Internal Medicine, vol. 35, October 1951, pp. 790 and 791.

Wolf: Jour. of the Am. Med. Asso., vol. 1955, May 22, 1954, pp. 339–341.

Digest of Treatment, vol. 1, January 1950, p. 100.